Sept. 2, 1924.

T. J. ERDMAN ET AL 1,506,820

PRESSURE REGULATING MECHANISM

Filed April 10, 1922

Witness:
E. Wilderson

Inventors;
Theodore J. Erdman
John Schaeffer
by W H Bliss
Attorney

Patented Sept. 2, 1924.

1,506,820

UNITED STATES PATENT OFFICE.

THEODORE J. ERDMAN AND JOHN SCHAEFFER, OF HORICON, WISCONSIN, ASSIGNORS TO VAN BRUNT MANUFACTURING COMPANY, OF HORICON, WISCONSIN, A CORPORATION OF WISCONSIN.

PRESSURE-REGULATING MECHANISM.

Application filed April 10, 1922. Serial No. 551,382.

*To all whom it may concern:*

Be it known that we, THEODORE J. ERDMAN and JOHN SCHAEFFER, citizens of the United States, residing at Horicon, in the county of Dodge and State of Wisconsin, have invented certain new and useful Improvements in Pressure-Regulating Mechanism, of which the following is a specification, reference being had therein to the accompanying drawing.

This invention relates to pressure regulating mechanism especially adapted for use on agricultural implements, such as grain drills, cultivators and the like.

It is usual in such implements to employ means for applying pressure to the earth working elements, and the pressure is usually applied by means of a compression spring operating on a rod or bar comprising one of the connections between the earth working elements and the main portion of the implement. It is frequently desirable to change the pressure exerted upon the earth working element and it is the object of this invention to provide means whereby the change in pressure may be easily and quickly accomplished.

Referring to the drawings in which like numerals indicate identical parts.

Figure 8 is a fragmentary detail showing the modified form of the pressure regulating means in adjusted position on the pressure rod.

Figure 1:
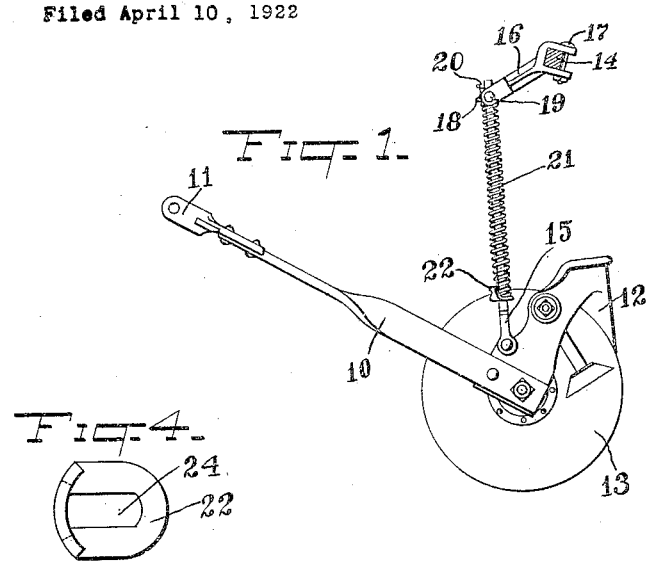
Figure 1 illustrates our invention as applied to the furrow opener of a grain drill.

In this instance our device is shown attached to a grain drill and 10 indicates the usual drag bar provided at its forward end with a bracket 11 by means of which the drag bar is pivotally connected to the main portion of the machine in the usual manner. A boot 12 at the rear of the drag bar has rotatably connected with it a disk 13 for forming the furrow in which the seed is deposited. A rock shaft 14 is rotatably supported on the main portion of the machine (not shown) and by rocking the shaft 14 the furrow openers, which are connected to it, can be adjusted to regulate the depth at which the disks 13 will penetrate the soil. The furrow openers are connected with the rock shaft 14 by means of a rod 15, which at its lower end is pivotally connected to the boot 12, and which, at its upper end, has loosely mounted thereon a collar 18 that has laterally projecting pins 19 to which the bifurcated forward end of an arm 16 is pivoted, the other end of the arm being clamped by means of a bolt 17 to the rock shaft 14. In the rod 15, above the collar 18, a pin 20 is secured and which extends from opposite sides of the rod and acts as a stop to limit the upward movement of the collar. A compression spring 21 is mounted on the rod 15 and bears at its upper end against the collar 18 and at its lower end against an adjusting means comprising a clip 22. The compression spring is interposed between the clip 22 and the arm 16 so that the furrow opener will be yieldingly held in its working position in order that the disk 13 may rise should it come in contact with an obstruction and automatically return to its working position as soon as the obstruction has been passed.

Figure 2:
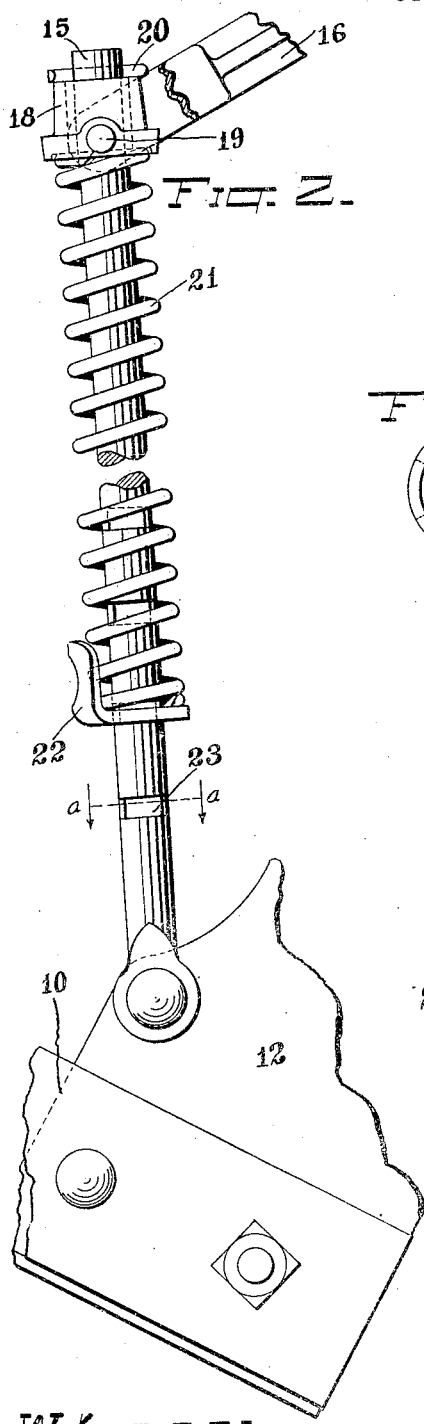
Figure 2 is an enlarged detail of the pressure regulating mechanism with the regulating means attached to the pressure rod.
Figure 4:
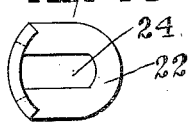
Figure 4 is a top plan view of the pressure regulating means in the position it assumes when it engages the pressure rod.
Figure 5:
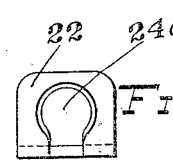
Figure 5 is a top plan view of the pressure regulating means in the position it assumes when in adjustable position.
Figure 6:
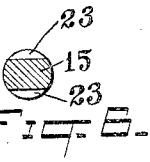
Figure 6 is a cross section on line *a—a* of Figure 2.
Figure 3:
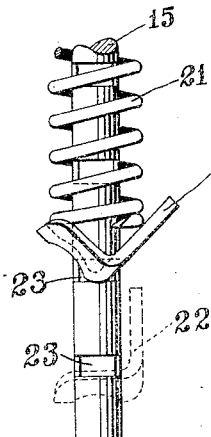
Figure 3 is a fragmentary detail showing the method of adjusting the pressure regulating means.

It is often desirable to adjust the spring in order to regulate the pressure of the spring on the furrow openers, and, inasmuch as a grain drill will be provided with a comparatively large number of furrow openers, it is important that the adjusting means may be quickly and easily moved. In order to accomplish this purpose the rod 15 is provided with spaced notches 23 on opposite sides of the rod, the notches on one side registering with those on the other side, as shown in Fig. 6. The movable clip 22, against which the lower end of the spring bears, is preferably made from a single piece of flat sheet metal in which a key hole shaped slot 24 is punched; the metal is then bent to an L-shape as best seen in Figures 2 and 3, the portion of the clip in which is the enlarged portion of the slot, designated as 24ª, is shaped to conform to the approximate outside diameter of the spring 21, as shown in Figure 4. The enlarged portion 24ª of the slot is of sufficient size to allow the clip to slide freely on the rod 15 and the reduced portion of the slot is smaller than the rod and is adapted to engage the notches 23. To adjust the tension of the spring 21 and with the clip 22 in the position shown in dotted lines in Figure 3, the spring is compressed until the lower portion is above the selected notch, the clip is raised until its lower portion is slightly above the base of the notch when the upwardly extending leg of the clip is turned downwardly, as shown in full lines in Figure 3, and the reduced portion of the slot 24 engages the selected notch. The clip 22 is then in the position shown in Figure 2, and forms an abutment for the lower end of the spring 21. The clip is securely held in position by the downward pressure of the spring and by the upwardly extending leg of the clip resting against a portion of the spring.

Figure 7:
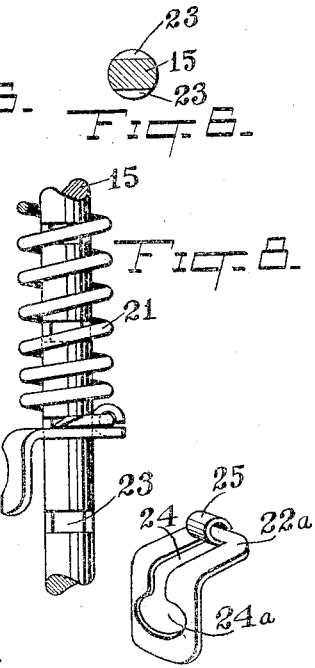
Figure 7 is a perspective view of a modified form of the pressure regulating means.

In the modified form, shown in Figures 7 and 8, the clip 22ª is formed similar to the clip 22 except that a portion of the metal struck away to form the reduced portion of the key hole slot is bent to form a lip 25 as best shown in Figure 7. The opening formed within the lip 25 is slightly larger than the diameter of the metal from which the spring 21 is made and is adapted to receive a portion of the spring when the clip 22ª is in position on the rod 15. In operation the clip 22ª is put in position in the same manner as that described for the clip 22 except that when placed on the rod the portion of the clip 22ª having the slot 24 and the lip 25 extends downwardly and when in adjusted position with the slot 24 engaging a notch in the rod the portion of the clip having the enlarged slot 24ª extends downwardly instead of upwardly as is the case when the clip 22 is employed. With the clip 22ª in adjusted position, the spring 21 is turned until the end of the spring enters the opening formed by the lip 25, as shown in Fig. 8, at which time the clip 22ª will be held securely in position.

We claim:

1. In a device of the class described, the combination of a rod having a series of notches therein, a spring surrounding the rod, and an adjustable abutment for the spring comprising a clip having a slot, one portion of the slot being larger and one portion smaller than the rod, the smaller portion being adapted to engage a notch in the rod to hold the clip in adjusted position.

2. In a device of the class described, the combination of a rod having a series of notches therein, a spring surrounding the rod, and an adjustable abutment for the spring comprising a clip having a key hole shaped slot, the enlarged portion of the slot being larger than the rod and the reduced portion smaller than the rod, the latter portion being adapted to engage a notch in the rod to hold the clip in adjusted position.

3. In a device of the character described, the combination of a rod having a series of notches therein, a spring surrounding the rod, and an adjustable abutment for the spring comprising an L-shaped clip having a slot, one portion of this slot being larger and one portion smaller than the rod, the smaller portion being adapted to engage a notch in the rod to hold the clip in adjusted position.

4. In a device of the class described, the combination of a rod having a series of notches on opposite sides thereof, a spring surrounding the rod, and an adjustable abutment for the spring comprising a clip having a slot, one portion of the slot being larger, and one portion smaller than the rod, the smaller portion being adapted to engage a notch in the rod to hold the clip in adjusted position.

5. In a device of the class described, the combination of a rod having a series of notches on opposite sides thereof, the notches on one side being directly opposite those on the other, a spring surrounding the rod, and an adjustable abutment for the spring comprising a clip having a slot, one portion of the slot being larger than the rod and the other portion smaller than the rod, the latter portion being adapted to engage a notch in the rod to hold the clip in adjusted position.

6. In a device of the class described, the combination of a rod having a series of notches therein, a spring surrounding the rod, and an adjustable abutment for the spring comprising an L-shaped clip having a slot, one portion of the slot being larger and one portion being smaller than the rod, the smaller portion being adapted to engage a notch in the rod to hold the clip in adjusted position, one arm of the clip having contact with the side of the spring when the clip is in adjusted position.

7. In a devce of the character described, the combination of a rod having a series of notches therein, a spring surrounding the rod, and an adjustable abutment for the spring comprising a clip having a slot, one portion of the slot being larger and the other portion smaller than the rod, the smaller portion being adapted to engage a notch on the rod, the clip having a lip adapted to engage with the spring when the clip is in adjusted position.

8. In a device of the character described, the combination of a rod having a series of notches therein, a spring surrounding the rod and an adjustable abutment for the spring comprising a clip having a slot, one portion of the slot being larger and the other portion smaller than the rod, the smaller portion being adapted to engage a notch on the rod, the clip having a lip adapted to engage with the spring when the clip is in adjusted position, said lip being formed by the metal struck from said slot.

9. In a device of the class described, a pressure spring, a rod, and a movable clip serving as a spring abutment on said rod and adapted selectively to be secured upon the rod at spaced points, said clip being formed of one piece of metal having one of its ends bent at an angle to the other end, one of said ends being formed with an aperture, and the other end being formed with an aperture having its width less than the diameter of the first said aperture, and one of its ends opening into the first said aperture.

10. In a device of the class described, a pressure spring, a rod, and a movable clip serving as a spring abutment on said rod and adapted selectively to be secured upon the rod at spaced points, said clip being formed of one piece of metal having one portion of its length bent at an angle to the remaining portion, one of said portions being formed with an approximately circular aperture, and the other portion being formed with an approximately rectangular aperture whose width is less than the diameter of the said circular aperture, and having its inner end opening into the said circular aperture.

11. In a device of the class described, a pressure spring, a rod, and a movable clip serving as a spring abutment on said rod and adapted selectively to be secured upon the rod at spaced points, said clip being formed of a single piece of metal having a substantially keyhole-shaped aperture provided therein and having one portion of its length bent at an angle to the remaining portion.

12. In a device of the class described, a pressure spring, a rod, and a movable clip serving as a spring abutment on said rod and adapted selectively to be secured upon the rod at spaced points, said clip having an aperture provided therein and having its two ends bent at an angle to each other on a line transversely of the aperture, the portions of the aperture in the two ends being of different widths.

13. In a device of the class described, a pressure spring, a rod, and a movable clip serving as a spring abutment on said rod and adapted selectively to be secured upon the rod at spaced points, said clip comprising an approximately rectangular sheet of metal formed with a keyhole-shaped aperture therein and lengthwise thereof, the ends of said metal being bent to form a right angle with each other on a line transversely of the rectangular shaped portion of the aperture with the two portions of the aperture substantially in different ends of the clip.

14. The combination with a rod, a spring coiled around said rod and bearing at one end against a fixed abutment on said rod with a clip for retaining said spring having its ends extending at substantially a right angle to each other, said rod having means whereby the clip is permitted to slide loosely along the rod when positioned with one of its ends parallel to the axis of the rod and is held tightly in place to retain the spring in fixed position when the clip is so positoned that the other end is parallel to the axis of the rod.

THEODORE J. ERDMAN.
JOHN SCHAEFFER.